(12) United States Patent
Zaw

(10) Patent No.: US 9,705,909 B2
(45) Date of Patent: Jul. 11, 2017

(54) AUTOMATIC DETECTION AND MITIGATION OF SECURITY WEAKNESSES WITH A SELF-CONFIGURING FIREWALL

(71) Applicant: Verizon Digital Media Services Inc., Playa Vista, CA (US)

(72) Inventor: Tin Zaw, Los Angeles, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 92 days.

(21) Appl. No.: 14/812,335

(22) Filed: Jul. 29, 2015

(65) Prior Publication Data

US 2017/0034199 A1  Feb. 2, 2017

(51) Int. Cl.
*H04L 29/06* (2006.01)

(52) U.S. Cl.
CPC ...... *H04L 63/1433* (2013.01); *H04L 63/0263* (2013.01); *H04L 63/0227* (2013.01); *H04L 63/1416* (2013.01)

(58) Field of Classification Search
CPC ............. H04L 63/1433; H04L 63/0263; H04L 63/1416; H04L 63/0227
USPC .......................................................... 726/13
See application file for complete search history.

(56) References Cited

U.S. PATENT DOCUMENTS

| | | | | |
|---|---|---|---|---|
| 9,118,711 B2* | 8/2015 | Oliphant | ............... | G06F 21/554 709/224 |
| 9,240,976 B1* | 1/2016 | Murchison | .......... | H04L 63/1408 709/224 |
| 9,325,735 B1* | 4/2016 | Xie | ........ | H04L 63/145 709/217 |
| 2007/0067841 A1* | 3/2007 | Yegneswaran | ...... | H04L 63/1491 726/23 |
| 2011/0225622 A1* | 9/2011 | Pearcy | .................. | H04L 43/028 726/1 |
| 2012/0304244 A1* | 11/2012 | Xie | ......... | G06F 21/00 726/1 |
| 2013/0086689 A1* | 4/2013 | Laverdiere-Papineau | ................ | G06F 21/54 726/25 |
| 2013/0166414 A1* | 6/2013 | Razvi | ..................... | G06Q 30/06 705/26.61 |
| 2014/0068701 A1* | 3/2014 | Burchfield | .......... | H04L 63/0263 726/1 |
| 2014/0359749 A1* | 12/2014 | Rieke | ...................... | H04L 63/02 726/11 |
| 2015/0161386 A1* | 6/2015 | Gupta | ................. | G06F 11/3612 726/23 |

(Continued)

*Primary Examiner* — Haresh N Patel
(74) *Attorney, Agent, or Firm* — Los Angeles Patent Group; Arman Katiraei

(57) ABSTRACT

Some embodiments provide a self-configuring firewall for automatic detection and mitigation of security weaknesses. The self-configuring firewall performs passive and active vulnerability detection. Passive detection involves scanning software resources and configurations under firewall protection for vulnerabilities present in the software and software configurations. Active detection identifies vulnerabilities by subjecting the software resources and configurations to simulated malicious traffic. The identified vulnerabilities are mapped to attack signatures. The self-configuring firewall enables the attack signatures which in turn allow the firewall to detect traffic containing attacks directed to exploiting the vulnerabilities.

20 Claims, 5 Drawing Sheets

(56) References Cited

U.S. PATENT DOCUMENTS

| | | | |
|---|---|---|---|
| 2015/0195172 A1* | 7/2015 | Abuelsaad | H04L 41/5061 709/224 |
| 2016/0182454 A1* | 6/2016 | Phonsa | H04L 63/0263 726/11 |
| 2016/0191463 A1* | 6/2016 | Mohanty | H04L 63/0227 726/11 |
| 2016/0241581 A1* | 8/2016 | Watters | H04L 63/1433 709/217 |
| 2016/0371071 A1* | 12/2016 | Reese | G06F 8/65 709/217 |

* cited by examiner

| Software | Version/Configuration | Vulnerability | Signature |
|---|---|---|---|
| PHP | 5.3.3 | 2014-9427<br>Exec. Code Overflow | Sig_ABC |
| | | 2014-0238<br>DoS Overflow | Sig_A31C |
| | 5.4.0 | 2014-9427<br>Exec. Code Overflow | Sig_ABC |
| | | 2015-0231<br>Exec. Code | Sig_AV5 |
| | | 2012-2688<br>Overflow | Sig_12DQ |
| WordPress | 3.9.1 | 2014-5266<br>DoS | Sig_BC1 |
| | | 2014-5204<br>Bypass CSRF | Sig_B5D |
| | | 2014-5203<br>Exec. Code | Sig_B3Q |
| | 3.9.2 | 2014-9033<br>Cross-Site Forgery | Sig_3ZCX |
| | | 2014-9039<br>Password Reset | Sig_3RSX |
| | 4.0 | 2014-9039<br>Password Reset | Sig_3PO |
| | | 2014-9037<br>Unauth. Access | Sig_3WA |
| ... | ... | ... | ... |

FIG. 4

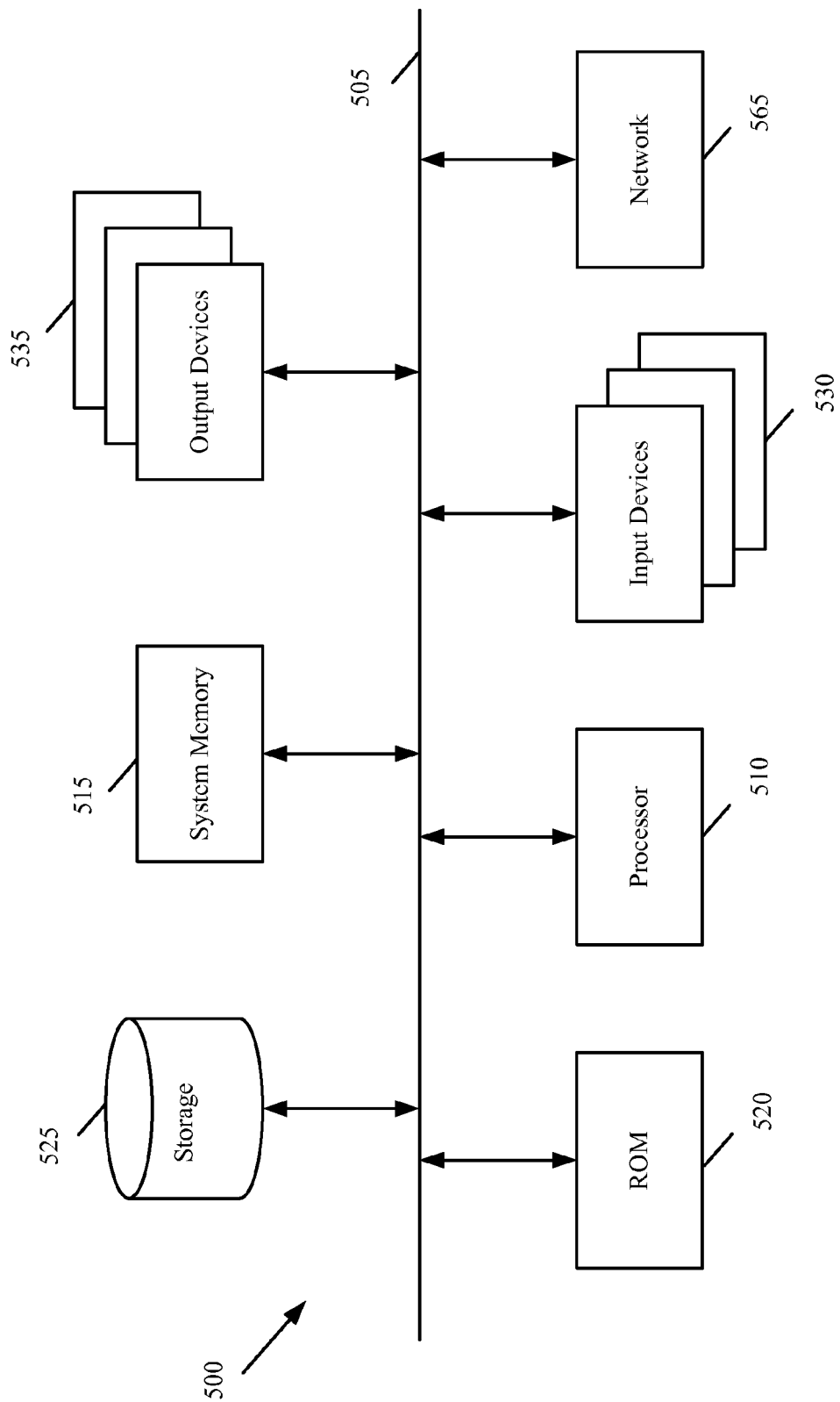

AUTOMATIC DETECTION AND MITIGATION OF SECURITY WEAKNESSES WITH A SELF-CONFIGURING FIREWALL

TECHNICAL FIELD

The present invention relates to network security and firewalls.

BACKGROUND ART

Firewalls protect against network based attacks. Firewalls detect attacks using attack signatures. Each attack signature is a rule or policy for detecting one or more attacks. An attack signature defines any of the parameters, structure, or format for one or more attacks. When inbound messaging is directed to a recipient behind the firewall, the firewall examines the messaging to determine if any patterns therein match any of the enabled attack signatures. When a match is found, the messaging is determined to harbor an attack. The firewall ordinarily would block such a message and prevent the message from reaching the intended recipient behind the firewall.

Firewall administrators have the ability to turn on and off different signatures to customize the protections provided by the firewall. Firewall administrators can simply turn on all attack signatures. This over inclusive approach may be effective so long as the signatures are updated to account for emerging threats. This over inclusive approach does however come at the expense of firewall performance. Each additional attack signature the firewall uses to inspect messaging consumes one or more processing cycles of the firewall, thereby introducing some temporal delay. A firewall under heavy load can quickly become overwhelmed when too many signatures are enabled and each inbound message is screened using a large number of signatures. The over inclusive approach also ignores the reality that certain threats are defused with internal system and software updates or with software reconfiguration. In other words, the firewall can waste processing resources and introduce unnecessary delay when attempting to detect and block threats that have been neutralized or resolved as a result of closing the security holes that the threats attempt to exploit.

To avoid the wasted processing cycles and the performance penalty resulting therefrom, firewall administrators can be selective in which attack signatures they enable. As different networks and service providers rely on different systems, software, and software configurations, each with their own vulnerabilities, administrators customize the firewall protections according to the vulnerabilities and attacks that the internally used systems and software are susceptible to.

However, administrators may be unaware of certain vulnerabilities or be unaware of what certain signatures protect against. Any firewall misconfiguration or signature omission can have severe ramifications if an attack successfully penetrates the firewall. Accordingly, one of the biggest issues is the human component and the manual manner with which firewall protections are configured.

There is therefore a need to automate firewall protections. To this end, there is a need to intelligently and automatically identify the vulnerabilities inherent within network systems, software, and software configurations, and to automatically customize the firewall protections in response. The end result would not only provide security, but security without performance penalties associated with protection against obsolete or neutralized attacks.

BRIEF DESCRIPTION OF THE DRAWINGS

A preferred embodiment of methods and systems for automated detection and mitigation of security weaknesses will now be described, by way of example only, with reference to the accompanying drawings in which:

FIG. 4 conceptually illustrates database entries identifying vulnerabilities of specific software configurations.

FIG. 5 illustrates a computer system or server with which some embodiments are implemented.

DETAILED DESCRIPTION

Some embodiments provide a self-configuring firewall. The self-configuring firewall intelligently and automatically detects and mitigates security weaknesses present within systems and software under protection of the firewall. In some embodiments, automatic security weakness detection involves scanning systems and software under firewall protection. The scanning identifies system and software vulnerabilities to specific attacks. In some embodiments, automatic security mitigation involves configuring the firewall without human or manual involvement and enabling firewall protections to block any attacks that could exploit the identified vulnerabilities inherent within the systems, software, and software configuration under firewall protection.

In some embodiments, the self-configuring firewall is a standalone appliance or device providing traditional firewall protections as well as self-configuring functionality for automatic detection and mitigation of security weaknesses. In some other embodiments, the self-configuring firewall is a software module that implements traditional firewall functionality as well as the self-configuring functionality described herein on a server or machine providing other functionality or services.

Figure 1:
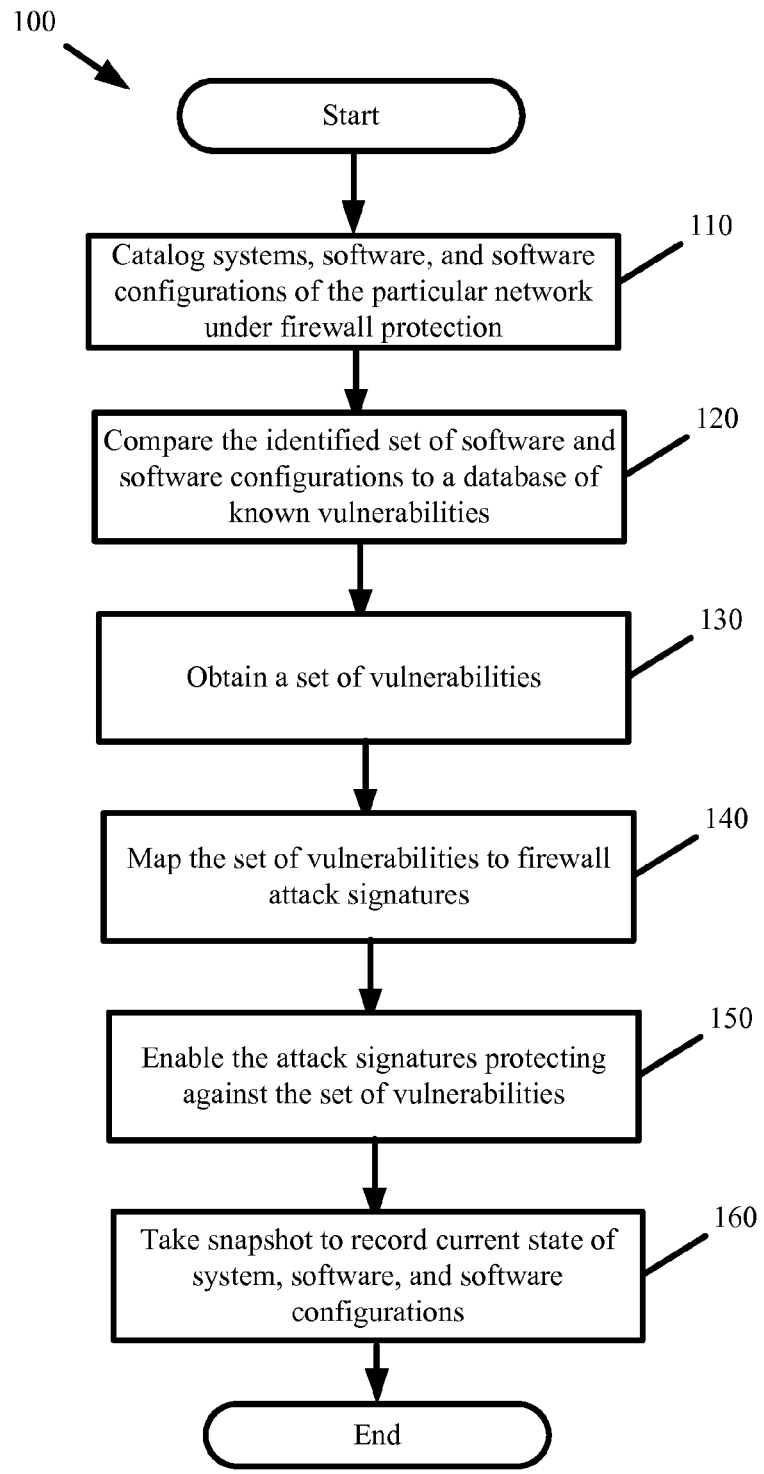
FIG. 1 presents a process for automatically detecting and mitigating security weaknesses inherent in the systems, software, and software configurations of a particular network.

FIG. 1 presents a process 100 for automatically detecting and mitigating security weaknesses inherent in the systems, software, and software configurations of a particular network. Process 100 is performed by the self-configuring firewall of some embodiments.

The process 100 commences by cataloging (at 110) the systems, software, and software configurations of the particular network. In some embodiments, the self-configuring firewall crawls within the particular network to catalog the systems, software, and software configurations. The crawling may involve scanning the address range of the particular network to identify the accessible systems. In some embodiments, scanning the address range of the particular network includes detecting each system or machine that is accessible at each Internet Protocol (IP) address within the particular network address prefix or subnet. The scanning may further involve scanning each port at each address to more precisely detect the accessible systems or machines. The crawling may also involve pinging each address or submitting requests using different communication protocols to each address. Once a machine is found, the crawling then involves identifying the software running on the machine as well as the configuration for any identified software. The software configuration can include at least the software version number and can include other configurable parameters. Software configurations can be identified by passing commands, scripts, or other input and by monitoring the targeted machine response. Remote procedural calls, system calls, or other third party tools can be used to assist in the software identification. In some embodiments, the self-configuring firewall crawling identifies any of a set of operating systems, databases, scripting languages, content management systems (CMS), web server software, and media server software accessible on an identified machine as well as the version number of each.

The process then compares (at 120) the identified set of software and software configurations (i.e., version numbers) to a database of known vulnerabilities. As new software vulnerability is discovered, the vulnerability along with the affected software and software version are entered to the database. In some embodiments, the database is centrally managed so that the self-configuring firewall can obtain an updated local copy of the database on a periodic basis (e.g., daily or hourly). The database may be compiled from security services, such as Symantec and Kapersky, or from trusted public sources including open source projects, such as ModSecurity. In any event, multiple instances of the self-configuring firewall can access the same database. In some embodiments, the security services and trusted public sources publish directly to the database.

From the comparison, the process obtains (at 130) a set of vulnerabilities. These vulnerabilities identify different network attacks that can compromise the machines or software running on the particular network machines. A compromised system is one in which an unauthorized user has gained access to or control over the machine or software, where the machine or software performs operations configured by an unauthorized user, where the machine or software provides unauthorized third party content and services, and where the machine or software has become unresponsive or are underperforming. The network attacks exploiting the vulnerabilities can take any of several forms including cross-site scripting attacks, structured query language (SQL) injection attacks, viruses, and phishing attacks as some examples.

The process maps (at 140) the set of vulnerabilities to firewall attack signatures. The attack signatures define regular expressions, formatting, identifiers, structures, rules, policies, or other means with which a firewall can detect the identified set of vulnerabilities.

The process then enables (at 150) the attack signatures that protect against the set of vulnerabilities. In this manner, the firewall is automatically self-configured without the assistance of a firewall administrator and manual firewall configuration.

The configuration at step 150 provides an initial configuration for the self-configuring firewall to protect the systems and software of the particular network in the state they are in when process 100 executes. However, systems, software, and software configurations continually evolve. New hardware adds to or replaces legacy hardware. New, updated, or changed software offers new functionality, features, and services. Any such change in system or software state can open new vulnerabilities and/or close old vulnerabilities. Moreover, new security threats continually emerge exposing vulnerabilities that may not have previously existed. As was noted above, even the most secure firewall becomes ineffective if the firewall does not adapt to new vulnerabilities regardless of whether those vulnerabilities stem from new attack methodology or changes in system or software state. Accordingly, process 100 continues by taking a snapshot of the particular network state to record (at 160) the systems, software, and software configurations that are currently in use and under protection of the self-configuring firewall of some embodiments.

Figure 2:
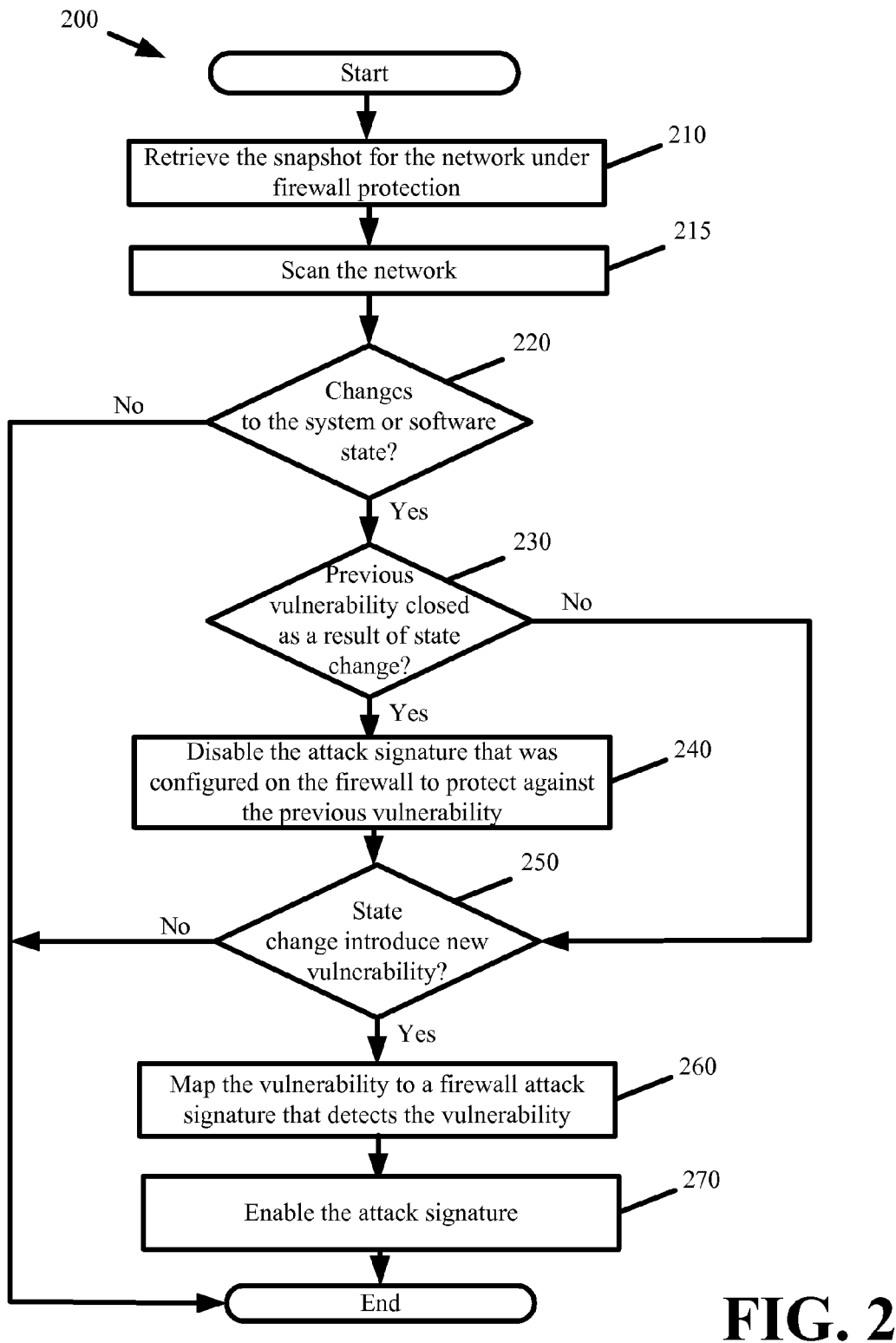
FIG. 2 presents a process for updating the self-configuring firewall configuration in accordance with some embodiments.

In some embodiments, the self-configuring firewall references the snapshot for periodically (e.g., daily, weekly, etc.) updating the self-configuring firewall configuration or whenever a change is made to the existing configuration. Using the snapshot, the self-configuring firewall can immediately identify what has changed and whether the changes expose new vulnerabilities or close existing vulnerabilities. FIG. 2 presents a process 200 for updating the self-configuring firewall configuration in accordance with some embodiments.

Process 200 commences by retrieving (at 210) the snapshot for the network under firewall protection. The process scans (at 215) the network to determine (at 220) if there has been any changes to the system or software state. Changes include new hardware, new software, or changes to software configuration, wherein a change to software configuration can be determined from software version numbering.

When no change is detected, the process 200 ends. When a change is detected, the process determines (at 230) if an existing attack signature was configured to address a vulnerability in the previous state and if that vulnerability still exists.

When a previous vulnerability is closed as a result of the change that was made, the process disables (at 240) the attack signature that was configured on the firewall to protect against the previous vulnerability. Disabling attack signatures directed to closed vulnerabilities ensures that the self-configuring firewall does not waste any processor resources or add any delay in blocking attacks directed to vulnerabilities that no longer exist. When a previous vulnerability remains in effect, the process does not change the firewall configuration.

The process refers to the database to determine (at 250) if the state change introduces a new vulnerability. When the state change does not create a new vulnerability, the process ends. When the state change introduces a new vulnerability, the process maps (at 260) the vulnerability to a firewall attack signature that detects the new vulnerability in inbound messaging screened by the firewall. The process enables (at 270) the attack signature, thereby configuring the firewall to prevent attacks directed to exploiting the vulnerability.

Figure 3:
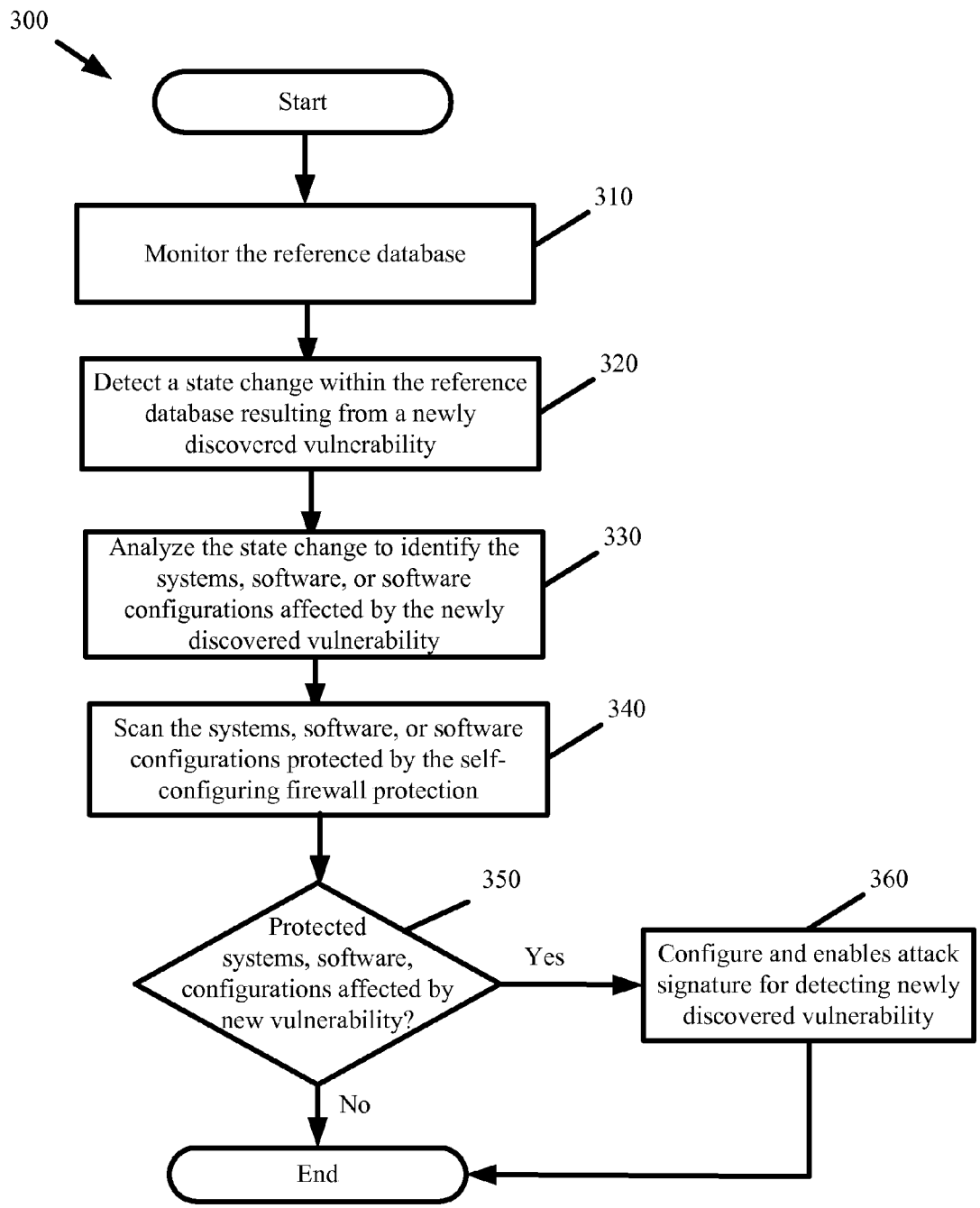
FIG. 3 presents a process for performing an inverse updating of the self-configuring firewall configuration in accordance with some embodiments.

It should be noted that processes 100 and 200 can also be performed on-demand as a result of new or emerging threats being discovered. In some such cases, attack signatures are enabled as soon as the new threats are discovered. In other cases, the self-configuring firewall performs an inverse updating process 300 presented in FIG. 3.

The process 300 involves the self-configuring firewall monitoring (at 310) the reference database to detect (at 320) a state change resulting from a newly discovered software or software configuration vulnerability. As noted above, the reference database can be updated by trusted public sources, security services, or a threat monitoring authority that supplies the self-configuring firewalls of some embodiments with updated vulnerability mapping information and firewall signatures to combat the new vulnerabilities.

The process analyzes (at 330) the state change to identify the systems, software, or software configurations that are affected by the newly discovered vulnerability. The process then scans (at 340) the systems, software, or software configurations protected by the self-configuring firewall protection to determine (at 350) if the vulnerability could affect them.

When the systems, software, or software configurations under the self-configuring firewall protection can be affected by the newly discovered vulnerability, the process configures (at 360) and enables the self-configuring firewall with the attack signature for detecting any attacks attempting to exploit the newly discovered vulnerability. When the systems, software, or software configurations under the self-configuring firewall protection cannot be affected by the newly discovered vulnerability, no change is made to the self-configuring firewall.

FIG. 4 conceptually illustrates reference database entries identifying vulnerabilities of specific software or software configurations. The figure depicts a listing of software and different configurations of the software as identified by different software versions.

Any vulnerabilities are identified next to the corresponding software version. The table further provides the mapping of each vulnerability to the firewall attack signature that allows a firewall to detect an attack exploiting the vulnerability in inbound messaging. The firewall attack signature specifies the pattern, parameters, structure, or format for messaging passing through the self-configuring firewall that transport attacks for exploiting the vulnerability.

Thusfar, the self-configuring firewall of some embodiments has been described with passive vulnerability detection. In some embodiments, the self-configuring firewall employs active vulnerability detection.

Active vulnerability detection involves generating and passing simulated malicious traffic into the network to identify vulnerabilities without actually harming the network or its operation. In other words, the self-configuring firewall performs an automated white hat hacking of the systems and software that are under the firewall's protection. Due its intrusive nature, active automated vulnerability detection may be performed when express consent is received from the users or networks under firewall protection.

When performing active vulnerability detection, the self-configuring firewall executes a set of scripts and regular expressions to generate traffic simulating a variety of external attack scenarios. The generated traffic mirrors messaging of cross-site scripting attacks, SQL injection attacks, brute force attacks, and the like. In some embodiments, the generated regular expressions are passed as query string arguments in request or acknowledgement packets, cookies, or are provided as inputs to databases or input fields (e.g., login pages) subject to external attack. The self-configuring firewall can pass the generated scripts using these other containers. Open source security scanning software such as, w3af, and other third party security scanning software can be used in the active vulnerability detection.

The self-configuring firewall monitors the response of the systems and software receiving the simulated malicious traffic. If the response results in aberrant behavior, then the self-configuring firewall has detected a vulnerability. Aberrant behavior can include responses in which the systems or software provide unauthorized access, provide unauthorized content, do not provide proper error messaging, become unresponsive, or suffer degraded performance.

The simulated malicious traffic can detect vulnerabilities that arise from the interaction of two or more software components and also from improper user configuration of software. In other words, active automated vulnerability detection can detect vulnerabilities that may not otherwise be present in software but for human error. Such vulnerabilities would not be detected with the passive automated vulnerability detection techniques described above with reference to processes 100 and 200.

Whenever the self-configuring firewall discovers a new vulnerability from active vulnerability detection, the self-configuring firewall maps the vulnerability to a firewall attack signature that detects the attack exploiting the vulnerability. The self-configuring firewall automatically adjusts its configuration to enable the attack signature and thereby block any traffic that harbors an attack attempting to exploit the vulnerability.

In some embodiments, the self-configuring firewall is adapted for distributed platforms with the self-configuring firewall protecting multiple content providers or service providers from attack. Some such embodiments involve implementing the self-configuring firewall as part of a distributed firewall service, such as a web application firewall (WAF) offered by a content delivery network (CDN).

A CDN operates multiple points-of-presence (PoPs) from which content and services of different customers are distributed to end users. The CDN optimizes the delivery of customer content and services in various ways, including distributing requested content and services from the PoP that is closest to a requesting end user. The CDN customers include content providers and service providers that rely on the CDN for the infrastructure to distribute their content and services.

Each PoP includes multiple servers hosting and distributing the customer content and services. The CDN WAF is formed by deploying one or more instances of the self-configuring firewall of some embodiments within each PoP. The CDN WAF, by operation of the self-configuring firewall, protects the PoP servers and the customer content or services running on the PoP servers from attack at each location where the content or services are available. In some embodiments, the CDN WAF protections stem from deploying the self-configuring firewall of some embodiments as a dedicated firewall appliance or machine within each PoP. In some embodiments, the CDN WAF protections stem from deploying the self-configuring firewall of some embodiments as a special purposed module that runs on each of the PoP servers, with the module on each server screening any messaging that is directed to that server.

In the context of a CDN, the self-configuring PoP firewalls operate according CDN customer defined firewall configurations. Each customer firewall configuration specifies a specific set of protections desired by the CDN customer. Each particular customer firewall configuration involves enabling and disabling different sets of attack signatures on the self-configuring firewall when content or services of the particular customer are implicated. Specifically, when a user submits a request for a piece of content or service of a particular CDN customer, the self-configuring PoP firewall receiving that request retrieves the particular CDN customer's firewall configuration and screens the request according to the signatures enabled within the particular CDN customer's firewall configuration. In this manner, different CDN customers can specify and receive different firewall protections from the CDN even though their content and services are served from the same CDN PoPs and servers.

A CDN customer may wish to supplement any manually enabled signatures within the CDN customer firewall configuration with the automated protections offered by the self-configuring firewall of some embodiments. The CDN customer may lack knowledge of what signatures are needed to protect their content and services, and therefore defer to the self-configuring firewall of some embodiments for customizing the CDN customer protections according to the content and services that are offered by that CDN customer through the CDN.

For each content or service offered from a CDN PoP, the self-configuring firewall determines the software that executes in order to provide the content or service. For example, video content served using a particular version of Adobe®'s Flash Media software may have different vulnerabilities than video content that is served using a particular version of Microsoft®'s Smooth Streaming software.

The self-configuring firewall automatically enables and disables different firewall rules and policies for different customers depending on the software used in distributing the customers' content and services to end users. When automatically enabling and disabling the attack signatures, the self-configuring firewall may add to or create a new customer firewall configuration. Whenever content or services of a customer are updated or underlying software changes, the self-configuring firewall rescans the customer software used in providing the content and services in order to determine if any signatures specified within that customer's firewall configuration should be enabled or disabled.

When adding to a manually defined customer firewall configuration, the self-configuring firewall does not automatically disable signatures that were manually enabled by the customer. If a manually enabled signature within a particular customer firewall configuration is determined to be unnecessary based on the software needed to distribute the customer's content or services, the self-configuring firewall may notify the customer. The customer can request the signature to be disabled in order to improve firewall performance or request the signature to remain enabled.

The CDN WAF therefore provides different protections for different CDN customers, while the self-configuring firewall of some embodiments automatically customizes what the protections for each CDN customer should be based on the software used in delivering the CDN customer specific content or services. In this manner, the self-configuring firewall compliments the underlying purpose of the CDN. Specifically, the self-configuring firewall optimizes content/service delivery performance of the CDN by optimizing CDN WAF performance. Rather than enable and apply the same set of firewall signatures for all CDN customers or enable and apply a baseline set of firewall signatures that protect software used by all CDN customers from attack, the self-configuring firewall of some embodiments adapts protections on a per customer basis according to the software used in delivering the content or services of each customer. For each CDN customer, the self-configuring firewall enables the attack signatures that protect against the CDN customer susceptible vulnerabilities, thereby avoiding wasted processing resources and unnecessary delay that would result from screening inbound messaging for other vulnerabilities that are not present in the systems, software, or software configurations used in delivering that CDN customer's content and services.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

FIG. 5 illustrates a computer system or server with which some embodiments are implemented. Such a computer system includes various types of computer-readable mediums and interfaces for various other types of computer-readable mediums that implement the various methods and machines described above (e.g., self-configuring firewall). Computer system 500 includes a bus 505, a processor 510, a system memory 515, a read-only memory 520, a permanent storage device 525, input devices 530, and output devices 535.

The bus 505 collectively represents all system, peripheral, and chipset buses that communicatively connect the numerous internal devices of the computer system 500. For instance, the bus 505 communicatively connects the processor 510 with the read-only memory 520, the system memory 515, and the permanent storage device 525. From these various memory units, the processor 510 retrieves instructions to execute and data to process in order to execute the processes of the invention. The processor 510 is a processing device such as a central processing unit, integrated circuit, graphical processing unit, etc.

The read-only-memory (ROM) 520 stores static data and instructions that are needed by the processor 510 and other modules of the computer system. The permanent storage device 525, on the other hand, is a read-and-write memory device. This device is a non-volatile memory unit that stores instructions and data even when the computer system 500 is off. Some embodiments of the invention use a mass-storage device (such as a magnetic or optical disk and its corresponding disk drive) as the permanent storage device 525.

Other embodiments use a removable storage device (such as a flash drive) as the permanent storage device Like the permanent storage device 525, the system memory 515 is a read-and-write memory device. However, unlike storage device 525, the system memory is a volatile read-and-write memory, such as random access memory (RAM). The system memory stores some of the instructions and data that the processor needs at runtime. In some embodiments, the processes are stored in the system memory 515, the permanent storage device 525, and/or the read-only memory 520.

The bus 505 also connects to the input and output devices 530 and 535. The input devices enable the user to communicate information and select commands to the computer system. The input devices 530 include alphanumeric keypads (including physical keyboards and touchscreen keyboards), pointing devices. The input devices 530 also include audio input devices (e.g., microphones, MIDI musical instruments, etc.). The output devices 535 display images generated by the computer system. The output devices include printers and display devices, such as cathode ray tubes (CRT) or liquid crystal displays (LCD).

Finally, as shown in FIG. 5, bus 505 also couples computer 500 to a network 565 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 500 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method for self-configuring a particular firewall, the method comprising:
    tracking different sets of vulnerabilities affecting different configurations of different software applications;
    mapping a set of software applications under protection of the particular firewall, wherein said mapping comprises scanning with the particular firewall, an address range of a network under protection of the particular firewall and detecting at the particular firewall, the set of software applications running on a set of machines addressable in said network as a result of said scanning;
    scanning a software configuration for each software application of the set of software applications based on one or more commands, scripts, and input passing from the particular firewall to the set of machines and a response each machine of the set of machines provides to said particular firewall as a result of said passing;
    identifying a subset of security vulnerabilities from the different sets of vulnerabilities present in said set of software applications and software configurations based on comparing the software configuration of each software application of the set of software applications from said scanning against the different configurations of the different software applications from said tracking; and
    automatically reconfiguring the particular firewall based on said identifying, wherein automatically reconfiguring comprises enabling on the particular firewall, a set of firewall signatures from a plurality of firewall signatures protecting against the subset of security vulnerabilities present in said set of software applications and software configurations, wherein the set of firewall signatures detect traffic comprising attacks directed to the subset of security vulnerabilities.

2. The method of claim 1 further comprising blocking traffic at the particular firewall comprising a pattern matching one signature from said set of firewall signatures.

3. The method of claim 1 further comprising disabling a particular enabled signature from the plurality of firewall signatures when the particular enabled signature protects against an attack directed to a vulnerability not within said subset of security vulnerabilities.

4. The method of claim 1 further comprising generating simulated malicious traffic resembling at least one attack directed to at least one vulnerability.

5. The method of claim 4 further comprising passing said simulated malicious traffic to said set of software applications and monitoring response of said set of software applications to said simulated malicious traffic.

6. The method of claim 5 further comprising enabling a firewall signature from the plurality of firewall signatures in response to a security vulnerability identified from monitoring the response to said simulated malicious traffic.

7. The method of claim 1, wherein the software configuration for a particular software application identifies a software version of the particular software application.

8. The method of claim 1 further comprising detecting a change in state to one software application of said set of software applications.

9. The method of claim 8 further comprising disabling a particular firewall signature from said set of firewall signatures when the change in state closes a particular security vulnerability from the subset of security vulnerabilities that the particular firewall signature protects against.

10. The method of claim 9 further comprising enabling a new firewall signature not of the set of firewall signatures when the change in state opens a new security vulnerability not previously identified in the subset of security vulnerabilities, wherein the new firewall signature is used in detecting traffic comprising an attack directed to the new security vulnerability.

11. The method of claim 1, wherein said identifying comprises matching the software configuration for a particular software application from the set of software applications to at least one security vulnerability and obtaining a firewall signature from the set of firewall signatures protecting against the at least one security vulnerability based on said matching.

12. A method for automatically configuring protections provided by a particular firewall, the method comprising:
    detecting a new security vulnerability after entry of the new security vulnerability in a vulnerability database;
    determining a particular version of a particular software application affected by said new security vulnerability;
    mapping systems under protection of the particular firewall, wherein said mapping comprises (i) sending one or more commands, scripts, and input from the particular firewall to said systems, (ii) monitoring at the particular firewall, a response each system of said systems returns as a result of said sending, and (iii) identifying a set of software applications running on said systems and a version number of each software application of the set of software applications based on said monitoring;
    configuring the particular firewall with a particular set of firewall protections from different sets of firewall protections in response to receiving at the particular firewall, a request directed to a particular system of said systems and the particular system having defined the particular set of firewall protections; and
    updating the particular set of firewall protections with a new protection in response to said request implicating the particular version of the particular software application running on said particular system and said determining that the particular version of the particular software application is affected by said new security vulnerability.

13. The method of claim 12, wherein said updating comprises enabling a firewall signature on the particular firewall allowing the particular firewall to detect and block traffic comprising an attack directed to the new security vulnerability.

14. The method of claim 12 further comprising detecting an update to the particular software application, said update changing the particular software application version number from a first version to a second version.

15. The method of claim 14 further comprising determining a particular security vulnerability present in the particular software application first version that is not present in the particular software application second version.

16. The method of claim 15 further comprising updating the particular firewall protections in direct response to said determining, wherein said updating comprises disabling a firewall signature used in detecting the particular security vulnerability.

17. The method of claim 12, wherein said updating is performed without manual or user action.

18. A method for self-configuring a particular firewall, the method comprising:
    producing a first snapshot recording a first set of software applications used in delivering content or services of a first customer at a first time and a second snapshot recording a different second set of software applications used in delivering content or services of a different second customer from a same set of servers;
    determining a first set of security vulnerabilities present in the first set of software applications and a different second set of security vulnerabilities present in the second set of software applications;
    generating a first customer firewall configuration with a first set of firewall signatures enabled from a plurality of firewall signatures and a second customer firewall configuration with a different second set of firewall signatures enabled from the plurality of firewall signatures, wherein the first set of firewall signatures detect traffic comprising attacks directed to the first set of security vulnerabilities, and wherein the second set of firewall signatures detect traffic comprising attacks directed to the second set of security vulnerabilities;
    screening traffic received at the particular firewall according to the first firewall configuration when the traffic is directed to the first customer content or services and according to the second firewall configuration when the traffic is directed to the second customer content or services;
    producing a third snapshot recording a modified first set of software applications used in delivering content or services of the first customer at a second time after the first time; and
    updating the first customer firewall configuration based on detecting a new vulnerability from comparing the third snapshot against the first snapshot and enabling a new firewall signature from the plurality of firewall signatures in protection against said new vulnerability, wherein the new vulnerability is introduced as a result of changing from the first set of software applications to the modified first set of software applications.

19. The method of claim 18, wherein said screening comprises (i) blocking at the particular firewall, traffic comprising an attack directed to any of the first set of security vulnerabilities using the first set of firewall signatures when the traffic is directed to the first customer content or services and (ii) blocking at the particular firewall, traffic comprising an attack directed to any of the second set of security vulnerabilities using the second set of firewall signatures when the traffic is directed to the second customer content or services.

20. The method of claim 18 further comprising automatically modifying the first firewall configuration and the second firewall configuration in response to a new security vulnerability present in both the first set of software applications and the second set of software applications, wherein automatically modifying comprises enabling a same firewall signature in the first firewall configuration and the second firewall configuration.

* * * * *